Patented June 1, 1943

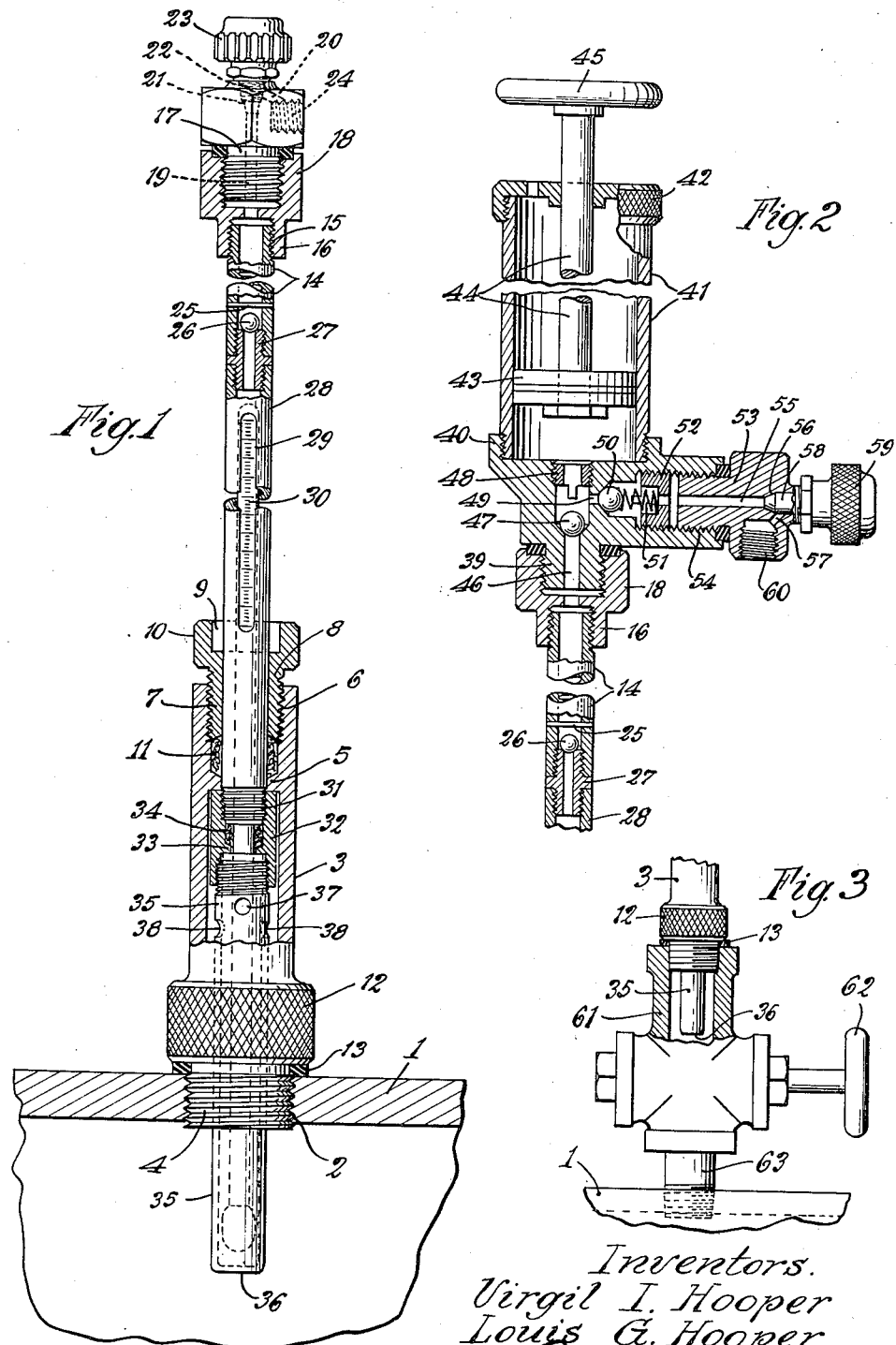

2,320,731

UNITED STATES PATENT OFFICE 2,320,731

LIQUID LEVEL GAUGE

Virgil I. Hooper, Gordon, Tex., and Louis G. Hooper, Shreveport, La., assignors to The Bastian-Blessing Company, Chicago, Ill., a corporation of Illinois Application August 4, 1939, Serial No. 288,262

13 Claims. (Cl. 73—292).

This invention relates to a gauging device, and has for one object to provide a means for gauging the depth of liquid within a tank. Another object is to provide means for sampling liquid within the tank. A third object is to provide means for testing the temperature within the tank; and a further object is to provide means for testing the temperature within a tank while the temperature-testing means or device remains within the tank sufficiently to be under the temperature and pressure conditions which prevail within the tank and, particularly, within the fluid of the tank.

Other objects will appear from time to time throughout the specification and the claims.

The invention is illustrated more or less diagrammatically in the accompanying drawing, wherein:

Figure 1 is a vertical section with parts broken away, parts omitted and some parts shown in elevation;

Figure 2 is a vertical section illustrating a modified form in which the device has associated with it a pump;

Figure 3 is a vertical section, with parts in elevation, showing a modified fitting.

Like parts are designated by like characters throughout the specification and the drawing.

1 is the wall of a tank which is provided with an opening as at 2, the wall of the opening being threaded. 3 is a hollow housing positioned with its interior in communication with the interior of the tank. It is provided with a threaded portion 4 adapted to be seated in the threading of the opening 2. It is provided with an inward annular projecting portion 5; and at its upper or outer end, it may be interiorly threaded as at 6 to receive the correspondingly threaded portion 7 of a packing gland 8. This gland itself may have an internal enlargement or cut-away portion 9, and may be given a hexagonal or other angular cross section in the portion 10 by means of which the gland may be screwed into or out of place to compress a body of packing material 11, which is positioned against the shoulder portion 5, and is subjected to variable compression by the gland 8. The housing member 3 may be provided with a knurled or roughened enlargement 12, by means of which it may be screwed into or out of position. A washer 13 may be used if desired.

The gauge member—that is to say, the member which serves for carrying a thermometer and, also, for gauging the depth of fluid within the tank, as well as a means of withdrawing or permitting the passage of fluid from the tank—is a tubular member 14. It is of whatever length is made necessary by the size of the tank with which it is to be used. At its upper end it may be threaded as at 15 to engage a hollow fitting 16. A valve housing member 17 is threaded in a correspondingly threaded enlargement 18 of the fitting 16. A passage 19 extends through the member 17 and communicates with the second passage 20. A valve seat 21 is formed preferably in the upper end of the passage 19. A valve member 22, which is screw threaded in the upper part of the passage 19, may be moved into and out of position to close or open the passage 19, and, thus, to prevent or permit fluid to pass from the passage 19 over the valve seat 21 and into the passage 20. The valve member 22 has an operating portion 23, which is knurled or notched as shown, by means of which it may be readily rotated. The passage 20 may communicate with a threaded seat 24, in which a pipe or connection of any desired form may be seated. Adjacent its lower end, the tube 14 may have a pin 25; and, below this, is positioned a ball check 26. A gland 27 is threaded into the lower end of the tube 14 and, thus, holds the ball check 26 in place. When closed the ball check is seated on the upper end of the gland 27. When opened, its upward movement is limited by the pin 25.

Threadingly engaged upon the lower end of the gland 27 is a tubular thermometer housing 28, which is slotted as at 29 to show a thermometer 30. At its lower end, the tube 28 may be threaded as at 31 to engage the upper end of a collar 32. An inwardly projecting annular shoulder 33 is formed in the collar and serves as a support for packing 34, which latter is compressed by the lower end of the tube 28 and held between it and the shoulder 33.

Secured to the lower end of the member 32 is a "dipper portion" 35, which surrounds the lower end of the thermometer and, particularly, the bulb of the thermometer. As shown, the dipper is provided with a closed bottom 36 and with a plurality of holes or openings 37, 38, which are, as shown, on different levels, at least one being positioned above the other. The effect of this positioning is to prevent any possibility of entrapment of air or gas within the dipper. Liquid may flow into one or another of the openings 38, and air or gas will readily escape through the opening 37. There may be any desired number of openings in the "dipper portion," provided it has a closed bottom so that it may bring up with it a quantity of liquid sufficient to surround or substantially to surround the thermometer bulb, and provided, also, that at least one hole or opening is positioned above another.

As shown in the modified form, there has been seated in the member 18 a pump assembly instead of the valve assembly shown in Figure 1. Thus, a member 39 is seated in the part 16, 18; and this member has an upper threaded enlargement 40 within which is seated the barrel 41 of a cylinder having a removable head 42. A piston 43 is secured to a piston rod 44. The rod may carry a handle 45 positioned outside of the cylinder and by means of which it and the piston may be reciprocated.

A passage 46 passes through the member 39, and has positioned within it a ball check 47. A hollow member 48 is positioned within a suitable enlargement of the passage 46 and holds the ball 47 against excessive movement in the opening direction. A second passage 49 leads from the enlargement of the passage 46. Another ball 50 is seated within a suitable enlargement of the passage 49 and is yieldingly held seated by a spring 51 bearing against a ported support 52. A hollow plug 53 is positioned in the hollow, interiorly threaded, lateral enlargement 54, within which the passage 49 is formed. The member 53 has a passage 55; 56 is a valve seat formed in the passage 55. 57 is a passage beyond the passage 55. 58 is a valve adapted to be seated on the seat 56 and provided with a handle 59 for movement in and out. The valve may, thus, be seated to close the passage 55 or it may be unseated to open the passage and to permit fluid to move from passage 55 to passage 57 and, thence, outwardly through passage 60, either directly to the air or to a receptacle or through a tube which may be threaded into corresponding threading in the passage 60.

Although there is shown an operative form of the device, it will be understood that many changes in the form, shape and arrangement of parts might be made without departing from the spirit of this invention; and it is desired that this showing be taken as, in a sense, diagrammatic.

In particular, the modified form of construction shown in Figure 3 may be used. As there shown, the hollow housing 3, instead of being screwed directly into an opening in the tank or tank wall, is screwed into a suitable opening in a valve housing 61, in which a valve of any suitable type is positioned. A handle 62 is provided for operating the valve, and the valve housing is attached to a nipple or connection 63, which is itself at its other end joined to the tank.

The use and operation of this invention are as follows:

The gauge assembly may be used in connection with a tank or container, fixed or stationary, and may be used to determine the depth of liquid within the tank, for use in withdrawing a sample of the material, and for testing its temperature. Under some conditions the gauge assembly may be a permanent part of the tank and remain always with it; and under other conditions it might be removable. Where, for any reason, there is no pressure in the tank, the removal of the gauge assembly is simple. The construction of Figure 3 is convenient for many purposes but, particularly, where the gauge is used in a pressure tank. In that case, to remove the gauge assembly it is necessary, first, to withdraw it above the valve. Then, the valve is closed, and the gauge and its housing 3 may be disconnected and the gauge assembly removed as a whole.

Assuming the parts to be substantially as shown, when it is desired to gauge the depth of the material within the tank, the gauge tube is pushed downward until it contacts the liquid. As the tube is pushed into the liquid, some will enter the perforations 37 and 38 in the dipper, thus bringing the thermometer in direct contact with the liquid within the tank. As the gauge assembly is pushed farther into the liquid, the slot of opening 29 in the tube 28 reaches the liquid. The gauge may be pushed down into the tank until the slot has passed through the packing and then the valve 22 may be opened slightly and the tube is then pushed farther until liquid, instead of gas, enters the tube 14 and flows or is pumped from the tube. This will occur when the upper rim of the slot 29 reaches the level of the liquid in the tank and cuts off the passage of gas into the slot 29. The gauge tube will have markings on its side by means of which the depth may be read. Ordinarily, the gauge markings are placed with respect to the top rim of slot 29 and read with respect to the top of gland 8. This gland is preferably adjustable only to slight variations in thickness of the packing 11. Such variation of the position of the gland would ordinarily be no more than one-sixteenth of an inch. Since gauges in this type of use are rarely calibrated closer than one-fourth of an inch, such a variation is unimportant. Frequently, such gauges are calibrated only in divisions of one inch. Frequently, and particularly where pressure is present in the tank, the valve at the upper end of the tube will be left open, and the gauge will be forced inwardly until there is an escape of liquid from the tube. This indicates that the liquid level has been reached. The pump of Figure 2 is installed in the device to assist in determining the liquid level where pressure is absent in the tank. Where that is done, air or gas is pumped out until liquid begins to come through the pump, thus indicating that the liquid level has been reached and, hence, determining the liquid level in this manner.

When it is desired to withdraw a sample, and where pressure is present sufficient to raise liquid through the tube, it is discharged past the small valve at the top of the tube and is received in any suitable receptacle. If there is not sufficient pressure to accomplish this, the pump assembly of Figure 2 may be used; and in that case liquid is pumped up the tube and discharged.

When it is desired to determine the temperature of the liquid in the tank, the gauge tube is pushed far enough into the liquid to make sure that the thermometer is brought adequately into the body of the liquid; and it is left there long enough to permit it to reach the temperature of that liquid. The thermometer bulb is within the dipper portion, and liquid enters through the openings in that portion. Two or more openings are provided on different levels so that there is no danger of an air lock, and the dipper will become completely full. At the same time, of course, since the opening through which the thermometer may be read is submerged, liquid enters the tube through that opening, and, if valve 22 is open and pressure is sufficient, rises in the tube to fill it.

When the thermometer has reached the temperature of the liquid within the tank, the gauge is raised, and a body of the liquid which has entered the dipper rises with it so that the thermometer bulb remains submerged in liquid which is at the temperature of the body of liquid within the tank. The gauge tube is raised to the position shown in Figure 1. In that position, its further upper movement is prevented by the contact of the collar with the shoulder or inner projection formed in the housing member. In that position, the thermometer bulb still remains within the housing, and, hence, subject to the pressure and temperature conditions prevailing in the tank; therefore, no evaporation or refrigeration effect can occur to cause a change in the thermometer reading. It remains, of course, surrounded by the liquid in the dipper. The upper end of the thermometer, however, has been withdrawn from the tank and is visible through the opening in the gauge tube. The thermometer may, thus, be read outside of the tank while the bulb of the thermometer remains within the tank.

If desired, the ball check mechanism shown in Figure 1 may be used. If it were not for the ball check, as soon as the slot in the tube cleared the fitting which is secured to the tank, all the liquid or gas within the tube would suddenly be discharged through the slot; and this might be dangerous or undesirable to the operator. With the ball check mechanism, however, as soon as the slot clears the fitting, and the fluid under pressure starts to discharge, the ball is seated, and further discharge is prevented. The material held in the gauge tube may, of course, be vented by operating the valve at the free end of the tube.

The operation of the form of Figure 2 is essentially that of Figure 1 except that the pump is provided for positively raising liquid in case, for any reason, that is necessary.

We claim:

1. In a thermometer and depth gauge assembly for tanks and the like, a hollow passage fitting, a tubular gauge member positioned within said fitting and adapted to have longitudinal movement therethrough, a stop on said tubular member limiting its outward movement, packing about said tubular gauge member, a dipper portion removably connected to the lower end of said tubular gauge member beyond the stop, said dipper having a plurality of holes therein and positioned at different levels, said tubular member having an opening therein above said stop and above said first mentioned holes, means for sealing the holes from communication with the opening through the tubular member, means for controlling the outflow of the contents of the tank through said opening, a thermometer positioned and supported by said sealing means in said tubular member and having its bulb in said dipper portion and being visible through said opening above said holes and means for exerting compression upon said sealing means to force same against said thermometer.

2. In a thermometer and depth gauge assembly for tanks and the like, a fitting secured to said tank and having a hollow passage therethrough, a tubular gauge member positioned within said fitting and adapted to have longitudinal movement in said passage, a stop on said tubular member limiting its outward movement, packing disposed in said passage about said tubular gauge member, controllable valve means at the upper end of the tubular member, means for exerting pressure upon said packing to force same upon said tubular member to establish a sliding sealed relationship, a dipper portion secured to the bottom of said tubular member below the stop, said dipper portion having a plurality of vertically spaced holes formed therein below said stop, said tubular member having an opening therein above said stop, a thermometer positioned in said tubular member and having its bulb disposed in said dipper portion and at its upper end extending beyond said stop to a place where same is visible through said opening, packing means for supporting the thermometer and sealing said dipper portion from said opening including an adjustable element to compress the packing means around the thermometer, said packing means being disposed in the tubular member between said opening and said holes.

3. In a thermometer and depth gauge assembly for tanks in which liquefied petroleum gases are stored in both their liquid and vapor phases, a fitting directly secured to the tank in sealed relationship and having a passage therethrough, an inwardly extending flange in said passage on said fitting, a tubular gauge member extending through said passage and flange within said fitting and adapted to have longitudinal movement with respect thereto, packing disposed against one side of said flange about said tubular gauge member, means for exerting compression upon said packing to force same against said flange and against said tubular member to establish a sliding seal between the fitting and tubular member, valve means for venting the interior of the tubular member to atmosphere, a dipper portion secured to the lower end of the tubular member below said flange, said dipper portion having an aperture means through the wall thereof for the ingress and egress of said liquefied gas, said tubular member having an opening therein above said aperture means, a thermometer positioned in said tubular member and having its bulb in said dipper portion and being visible through said opening, means for sealing the upper end of said dipper portion below said opening including packing within said tubular member bearing against said thermometer to hold same in place, and means for exerting compression upon said packing to support said thermometer against relative longitudinal movement between the thermometer and the member.

4. In a thermometer and depth gauge assembly for tanks and the like, a hollow fitting having a passage therethrough and an inwardly projecting member in said passage, a multi-part tubular gauge member positioned in said fitting and adapted to have longitudinal movement therein, packing around said tubular member, means for exerting compression upon said packing to force the same against said tubular member, a stop carried by said tubular member joining two of the parts together and adapted to contact said inwardly projecting member to prevent outward movement of said tubular member beyond a predetermined point under pressure existing in said tank, one of said ports being a removable dipper portion mounted below said stop, said dipper portion having a plurality of holes positioned at different levels formed therein, said tubular member having an opening therein above said first mentioned holes, means for venting said tubular member to the atmosphere when the opening is disposed below said projecting member, a thermometer positioned in said tubular member and having its bulb in said dipper portion, said thermometer being visible through said opening above said holes, and packing means between said opening and holes for supporting the thermometer.

5. In a thermometer and depth gauge assembly for tanks and the like, a fitting secured in sealed relationship with said tank and having a passage therethrough provided with an inwardly projecting member, a tubular gauge member positioned within said fitting and adapted to have longitudinal movement therethrough, a second fitting carried by the tubular member to close the upper end thereof, valve means in said second fitting to control the flow of fluid through said tubular member, packing around said tubular gauge member, means for exerting compression upon said packing to force same against said tubular member to establish a sliding sealed relationship between said tubular member and said first mentioned fitting, a stop carried by said tubular member adapted to contact said inwardly projecting member, a dipper portion below said stop, said dipper portion having a plurality of holes positioned at different levels formed therein, said tubular member having an opening therein above said holes, a seal below said opening including packing within said tubular member, a thermometer supported by said seal and positioned in said tubular member, said thermometer having its bulb and its dipper portion below said holes and being visible through said opening, and means for exerting compression upon said packing to force same against said thermometer in supporting relationship.

6. In a thermometer and depth gauge assembly for tanks in which liquefied gases are stored in both their liquid and vapor phases, a hollow fitting secured in sealed relationship with respect to the tank and having a passage therethrough provided with a flange projecting inwardly from the wall of said passage, a tubular gauge member positioned in said passage through said flange and adapted to have longitudinal movement with respect to said fitting, a check valve in the upper portion of said tubular member, packing about said tubular gauge member, means for exerting compression upon said packing to force same against said tubular member to establish a sliding seal between said tubular member and the fitting throughout said longitudinal movement, a stop carried by said tubular member cooperating with said inwardly projecting member to limit outward movement of said tubular gauge member, a dipper portion below said stop, said dipper portion having aperture means formed therein, and said tubular member having aperture means formed therein above said first mentioned aperture means, a thermometer positioned in said tubular member having its bulb disposed in said dipper portion below said first aperture means and being visible through one of said aperture means, a seal separating the bulb from the upper of said aperture means including packing disposed between said upper and lower aperture means within said tubular member and bearing against said thermometer, and means for exerting compression upon said packing to force same against said thermometer to support the thermometer in its relative longitudinal movement with respect to the tubular member, and means for preventing the escape of fluid through said tubular member from the upper of said aperture means including a valve positioned in said tubular member above the upper of said aperture means.

7. In a thermometer and depth gauge assembly for tanks and the like, a fitting secured in sealed relationship with respect to said tank and having a passage therethrough provided with a member in said fitting projecting inwardly from the walls of said passage, said inwardly projecting member comprising a packing abutment, an upper tubular gauge member positioned within said fitting, threaded at the lower end and adapted to have longitudinal movement past said inwardly projecting member, a bleeder valve in the top of said tubular member, packing about said tubular member and upon one side of said inwardly projecting member, means for exerting compression upon said packing to force same against said tubular member to provide a sliding seal between the tubular member and the fitting, a stop member threaded to the lower end of said tubular member and adapted to engage said inwardly projecting member when the tubular member is moved outwardly a predetermined distance, a dipper portion threaded to said stop member, aperture means in said dipper member and second aperture means above the first in communication with the tubular member, a thermometer positioned in said tubular member and having its bulb disposed in said dipper, and packing means in said stop member for supporting the thermometer in position, one of said threaded connections operating to tighten the packing supporting said thermometer.

8. In a device of the class described, a fitting adapted to be received in a threaded opening and having a passage therethrough, an inwardly projecting member formed in said fitting, said member comprising a packing abutment on one side and a stop shoulder upon the other, a tubular gauge member positioned within said fitting and adapted to have longitudinal movement therethrough, packing about said tubular gauge member disposed against said abutment, means for exerting compression upon said packing to force same against said tubular member, a valve in said tubular member above said packing, a stop carried by said tubular member below said packing to engage the shoulder portion of said inwardly projecting member, a dipper carried by said tubular member and disposed below said stop, said dipper having aperture means therein providing ingress and egress of liquid to and from the dipper at vertically spaced levels, said tubular member having an opening therein above said aperture means, a thermometer positioned in said tubular member and disposed with its bulb in said dipper portion, said thermometer being visible through said opening, and packing within said tubular member bearing against said thermometer to prevent outward flow of fluid past the thermometer when the tubular member is raised, and means for exerting a compression upon said packing to force the same against the thermometer, and check valve means preventing downward flow over the thermometer of fluid withdrawn from the tank.

9. In a device of the class described adapted to be received in a threaded opening, the combination of a fitting having a passage therethrough and a member in the fitting projecting inwardly from the walls of said passage, said inwardly projecting member comprising a packing abutment on one side and a stop shoulder upon the other, a tubular gauge member positioned within said fitting and adapted to have longitudinal movement therethrough, controllable valve means at the upper end of the tubular member, packing about said tubular gauge member disposed against said abutment, adjustable means for exerting compression upon the packing to force same against said tubular member to establish a sliding seal between the tubular member and the fitting, a stop carried by said tubular member and adapted to engage said stop shoulder, a dipper carried by said tubular member below said stop, said dipper having a filler hole formed therein, said tubular member having an opening therein above said filler hole, a thermometer positioned in said tubular member and having its bulb disposed in said dipper portion below said hole with the upper portion of said thermometer visible through said opening, means for sealing said bulb from said opening, including packing within said tubular member below said shoulder bearing against said thermometer, and means for exerting compression upon said packing to force same against said thermometer, and means interchangeable with said controllable valve means to assist with the withdrawal of fluid from the tank.

10. In a thermometer and depth gauge assembly for tanks and the like, a hollow passage fitting, an inwardly projecting member formed in said fitting, said member comprising a packing abutment, a tubular gauge member positioned within said fitting and adapted to have longitudinal movement therethrough, packing about said tubular gauge member disposed against said abutment, adjustable means for exerting compression upon said packing to force same against the tubular means to establish a sliding seal, a stop carried by said tubular member, and adapted to contact said inwardly projecting member, a dipper portion below said stop, said dippper having a plurality of holes positioned on different levels and formed therein, said tubular member having an opening therein above said first mentioned holes, a thermometer positioned in said tubular member and having its bulb in said dipper portion and being visible through said opening above said holes, and packing above said holes within said tubular member bearing against said thermometer, and means for exerting compression upon said packing to force same against said thermometer, said tubular gauge member having an outlet opening formed adjacent its upper end, a valve therefor and means for opening and closing the valve, and means preventing the back flow of fluid to said first mentioned opening comprising a check valve positioned in said tubular member above said thermometer sight opening.

11. In a gauge for gauging and testing the contents of tanks and the like, a fitting on said tank having a passage therethrough, a tubular gauge extending through said fitting and adapted to be moved longitudinally up and down in the tank, valve means carried by said tubular gauge, means supported by said fitting for supporting said gauge, said means including a closure member positioned in the outer end of said fitting to support the gauge member in sliding relationship throughout said longitudinal movement, a packing abutment on said fitting within said passage, packing within said fitting engaging said tubular gauge, and means cooperating with said abutment for applying compression to said packing to effect a tight seal between said packing and said tubular gauge, a stop on the tubular gauge preventing withdrawal of the tubular gauge from the fitting, and a hollow dipper portion below said stop removably secured to said tubular gauge below said packing, said dipper being provided with a plurality of perforations at different levels, a thermometer within said dipper portion, packing within said tubular member above said perforations for supporting the thermometer, said tubular gauge having an opening through which said thermometer may be observed, and said stop on the tubular gauge comprising an element for joining said dipper portion to said tubular gauge.

12. In a gauge for gauging and testing the contents of tanks and the like, a passage fitting on said tank, a tubular gauge extending through said fitting and adapted to be moved therethrough into said tank, means supported by said fitting for supporting said gauge, said means including a closure member positioned in the outer end of said passage fitting and through which said gauge is longitudinally moved, a fixed packing abutment within said fitting, packing within said fitting engaging said tubular gauge, means for applying compression to said packing to effect a tight seal between said packing and said tubular gauge, and a hollow dipper portion removably secured to the lower end of said tubular gauge, said dipper being provided with a plurality of perforations at different levels, a connection joining said tubular gauge to said dipper, a packing abutment formed within said connection, packing within said connection and means for applying compression thereto, a thermometer within said dipper portion engaged by said packing and extending therethrough into said tubular gauge member, said tubular gauge member having controllable valve means in its outer end and an opening through which said thermometer is observed.

13. In a gauging and sampling means for tanks and the like, a hollow passage fitting on said tank, a closure means positioned in said fitting, a jointed tube having a check valve therein and movable lengthwise into and out of said tank and into said fitting and past said closure means, controllable valve means in the outer end of said jointed tube, a thermometer in said tube below the check valve, said tube having an opening therein opposite a part of said thermometer, packing within said fitting about said tube, means for compressing said packing against said tube, a dipper portion secured to said tube, said dipper having openings at different levels formed therein, packing within said tube about said thermometer for supporting same against longitudinal displacement, means for exerting compression upon the packing to force same against the thermometer, and a stop carried by said tube positioned above the openings of the dipper portion and below the thermometer observing opening in the tube.

VIRGIL I. HOOPER.
LOUIS G. HOOPER.